United States Patent
Toyoda et al.

[11] Patent Number: 5,899,636
[45] Date of Patent: May 4, 1999

[54] REVERSIBLE LINING TUBE FOR REPAIRING AN EXISTING PIPELINE

[75] Inventors: Shigeru Toyoda, Saitama-ken; Shuichi Yagi; Masaaki Itagaki, both of Kanagawa-ken; Kazuki Okabe, Tokushima-ken, all of Japan

[73] Assignees: Tokyo Gas Co. Ltd.; Nisshinbo Industries, Inc., both of Tokyo, Japan

[21] Appl. No.: 08/790,966

[22] Filed: Jan. 29, 1997

[30] Foreign Application Priority Data

Feb. 9, 1996 [JP] Japan ................................. 8-024410

[51] Int. Cl.⁶ .................................................. E03B 7/09
[52] U.S. Cl. ............................................................ 405/157
[58] Field of Search ..................... 405/154–157

[56] References Cited

U.S. PATENT DOCUMENTS

| | | | |
|---|---|---|---|
| 4,334,943 | 6/1982 | Zenbayashi et al. | 156/287 |
| 4,350,548 | 9/1982 | Zenbayashi et al. | 156/156 |
| 4,368,091 | 1/1983 | Ontsuga et al. | 156/287 |
| 4,427,480 | 1/1984 | Kamuro et al. | 156/287 |
| 4,600,615 | 7/1986 | Hyodo et al. | 138/125 |
| 4,684,556 | 8/1987 | Ohtsuga et al. | 428/36.1 |

FOREIGN PATENT DOCUMENTS 7-229165  9/1995  Japan .

OTHER PUBLICATIONS

Toray Web Site, p. 3, Apr. 1996.

*Primary Examiner*—David J. Bagnell
*Assistant Examiner*—Tara L. Mayo
*Attorney, Agent, or Firm*—Nikaido Marmelstein Murray & Oram, LLP

[57] ABSTRACT

A reversible lining tube for repairing an existing pipeline is reversible into the existing pipeline so that its initial inner surface becomes its outer surface which adheres to the internal surface of the pipeline. In detail, the reversible lining tube includes an elastomer layer and a flock layer, prior to reversal into the existing pipeline the elastomer layer is an outer layer and the flock layer is an inner layer, upon reversal into the existing pipeline the elastomer layer becomes an inner layer and the flock layer becomes an outer layer which adheres to the internal surface of the existing pipeline.

10 Claims, 8 Drawing Sheets

REVERSIBLE LINING TUBE FOR REPAIRING AN EXISTING PIPELINE

BACKGROUND OF THE INVENTION

The present invention relates to a lining tube for use in repairing an existing pipeline, particularly to a lining tube reversible into an existing underground pipeline such as a gas pipe, water pipe, etc. so that its initial inner surface becomes outer surface which adheres to the internal surface of the existing pipeline.

FIG. 7 shows a process where a reversible lining tube 6 is reversed into an existing underground pipeline 1 to repair the same, which process has been disclosed in Japanese Patent Application No. 7-229165.

According to the process shown in FIG. 7, at first, a resilient leading pig 3 is introduced into the existing underground pipeline 1. Then, a necessary amount of adhesive agent 5 is introduced into the pipeline 1. Afterwards, one end of a reversible lining tube 6 is fixed at an open end 1a of the pipeline 1 in a manner such that the lining tube 6 may be reversed into the pipeline 1.

As shown in FIG. 7, a suction apparatus P is connected to an opposite open end 1b of the pipeline 1, so that a negative pressure may be produced into the pipeline 1 to cause the leading pig 3 and the adhesive agent 5 to move towards the open end 1b of the pipeline 1, thereby enabling the reversible lining tube 6 to be reversed into the pipeline 1. In this way, the initial inner surface of the lining tube 6 becomes outer surface which adheres to the internal surface of the existing underground pipeline 1.

Alternatively, instead of using a suction apparatus P, it is possible to connect a pressurizer apparatus (not shown) to the open end 1a. Then, by operating the pressurizer apparatus, a positive pressure is produced into the pipeline 1 to cause the leading pig 3 and the adhesive agent 5 to move towards the open end 1b of the pipeline 1, thereby enabling the reversible lining tube 6 to be reversed into the pipeline 1. In this way, the initial inner surface of the lining tube 6 becomes outer surface which adheres to the internal surface of the pipeline 1.

The lining tube 6 used in the process shown in FIG. 7 comprises an elastomer layer 10 (for instance, polyurethane layer) and a fabric layer 11 (consisting of laterally arranged threads and longitudinally arranged threads), as illustrated in FIG. 8.

Referring again to FIG. 8a–8b, when the lining tube 6 comprising the elastomer layer 10 and the fabric layer 11 is reversed into the pipeline 1, the fabric layer 11 becomes an outer layer to absorb the adhesive agent 5 so as to adhere to the internal surface of the pipeline 1.

However, since the fabric layer 11 has a considerable thickness and a hardness, it is difficult to reduce the overall thickness and hardness of the lining tube 6. As result, when the lining tube 6 is reversed in the pipeline 1, it has been found that the reversal of the lining tube 6 in the pipeline 1 is relatively difficult, especially when passing through a bent portion 1c of the pipeline 1.

On the other hand, as illustrated in FIGS. 9a–9b, if a lining tube consisting only of a single layer 10 (elastomer layer) is used in repairing an existing underground pipeline 1, it is found that the reversal of the lining tube in the pipeline 1 is easier than the lining tube shown in FIGS. 8a–8b, especially when passing through a bent portion 1c of the pipeline 1.

However, since the elastomer layer 10 fails to absorb the adhesive agent 5, it has been found that the lining tube shown in FIGS. 9a–9b is difficult to adhere to the internal surface of the pipeline 1. Also, since the elastomer layer 10 fails to absorb the adhesive agent 5, an adhesive agent layer 5 formed between the elastomer layer 10 and the pipeline internal wall will become uneven, causing an uneven surface of the lining layer on the pipeline internal wall.

SUMMARY OF THE INVENTION

An object of the present invention is to provide an improved lining tube for use in repairing an existing pipeline, so as to solve the above-mentioned problems peculiar to the above-mentioned prior arts.

According to a first aspect of the present invention, there is provided such a lining tube which is reversible into the existing pipeline so that its initial inner surface becomes outer surface which adheres to the internal surface of the pipeline. In particular, the reversible lining tube according to the first aspect of the present invention includes an elastomer layer and a flock layer, prior to reversal into the existing pipeline the elastomer layer is an outer layer and the flock layer is an inner layer, upon reversal into the existing pipeline the elastomer layer becomes an inner layer and the flock layer becomes an outer layer which adheres to the internal surface of the existing pipeline.

In the above improved reversible lining tube according to the first aspect of the present invention, the elastomer layer is a polyurethane layer, a polyester layer, a butyl rubber layer, a polyisobutylene layer, or a polyvinyl chloride layer. The flock layer is a fiber layer which is formed by first coating one surface of the elastomer layer with an adhesive agent and then causing an amount of short fiber to adhere to the adhesive-coated surface of the elastomer layer by virtue of static electricity effect. In detail, said short fiber of the flock layer is an aromatic polyamide fiber, a nylon fiber, a rayon fiber, a polyester fiber such as TETORON, an acrylic fiber, a vinylon fiber, or a polypropylene fiber.

According to a second aspect of the present invention, there is provided another lining tube which is reversible into the existing pipeline so that its initial inner surface becomes outer surface which adheres to the internal surface of the pipeline. In particular, the reversible lining tube according to the second aspect of the present invention includes an elastomer layer and a thread-knitted layer, prior to reversal into the existing pipeline the elastomer layer is an outer layer and the thread-knitted layer is an inner layer, upon reversal into the existing pipeline the elastomer layer becomes an inner layer and the thread-knitted layer becomes an outer layer which adheres to the internal surface of the existing pipeline.

In the above improved reversible lining tube according to the second aspect of the present invention, the thread-knitted layer is formed as a thread-knitted tube, the thread material of the thread-knitted layer is formed by covering an polyurethane elastic thread with either a polyester thread or a nylon thread. The elastomer layer is a thermoplastic polyurethane elastomer layer.

The above objects and features of the present invention will become more understood from the following description with reference to the accompanying drawings.

BRIEF DESCRIPTIONON OF DRAWINGS

DETAILED DESCRIPTION OF THE PREFERRED EMBODIMENTS

Figure 1A:
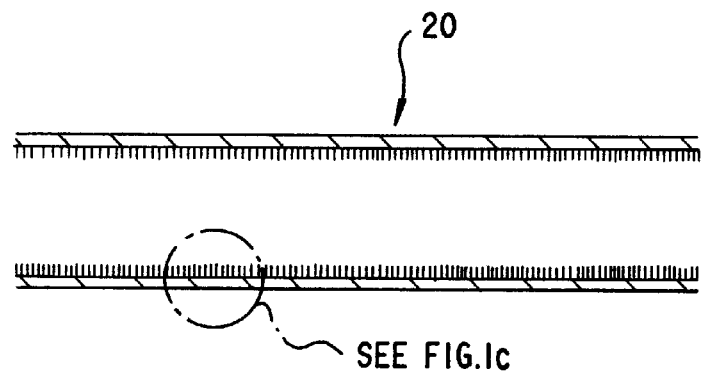
FIGS. 1a and 1c are a longitudinally cut cross sectional view showing a reversible lining tube for repairing an existing pipeline, according to the first aspect of the present invention.
Figure 1C:
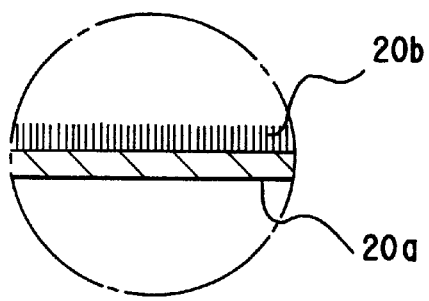
Figure 1B:
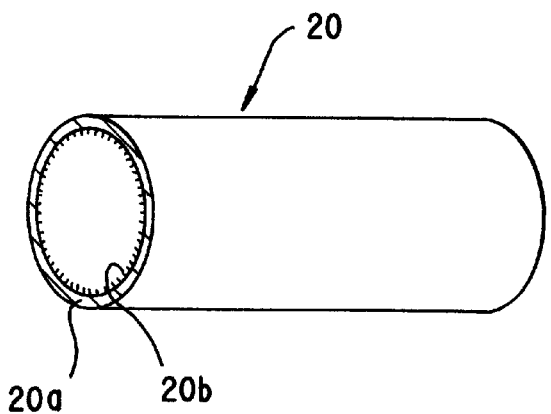
FIG. 1b is a perspective view illustrating the reversible lining tube shown in FIGS. 1a and 1c.

Referring to FIGS. 1a, 1b and 1c showing a reversible lining tube according to the first aspect of the present invention, a reversible lining tube 20 for repairing an existing underground pipeline has an elastomer layer 20a and a flock layer 20b. Prior to reversal into an existing underground pipeline, the elastomer layer 20a is an outer layer and the flock layer 20b is an inner layer. Upon reversal into the existing underground pipeline, the elastomer layer 20a becomes an inner layer and the flock layer 20b becomes an outer layer which adheres to the internal surface of the existing underground pipeline.

The elastomer layer 20a is a polyurethane layer having a predetermined dilation and a tensile strength. Alternatively, the elastomer layer 20a may be a polyester layer, a butyl rubber layer, a polyisobutylene layer, or a polyvinyl chloride layer, provided that they have substantially the same dilation and the same tensile strength as those of the polyurethane layer.

In detail, the elastomer layer 20a has a thickness of 0.3–1.5 mm. If the thickness of the elastomer layer 20a is less than 0.3 mm, it will be difficult for the reversible lining tube 20 to have a sufficient strength. On the other hand, if the thickness of the elastomer layer 20a is greater than 1.5 mm, there will be a difficulty during reversing movement of the lining tube 20 in an existing pipeline.

The flock layer 20b is a fiber layer which is formed by first coating one surface of the elastomer layer 20a with an adhesive agent and then causing an amount of short fiber to adhere to the adhesive-coated surface of the elastomer layer 20a by virtue of static electricity effect. Alternatively, the flock layer 20b may also be formed by spraying (using a pressurized air) the short fiber on to the adhesive-coated surface of the elastomer layer 20a.

Here, the short fiber of the flock layer 20b is an aromatic polyamide fiber, a nylon fiber, a rayon fiber, a polyester fiber such as TETORON, an acrylic fiber, a vinylon fiber, or a polypropylene fiber. Alternatively, the short fiber of the flock layer 20b may also be a semi-synthetic fiber, a synthetic inorganic fiber or a natural fiber.

Further, the flock layer 20b has a thickness of 2 mm or less. If the thickness of the flock layer 20b is greater than 2 mm, there will also be a difficulty during the reversing movement of the lining tube 20 in an existing pipeline.

Figure 2:
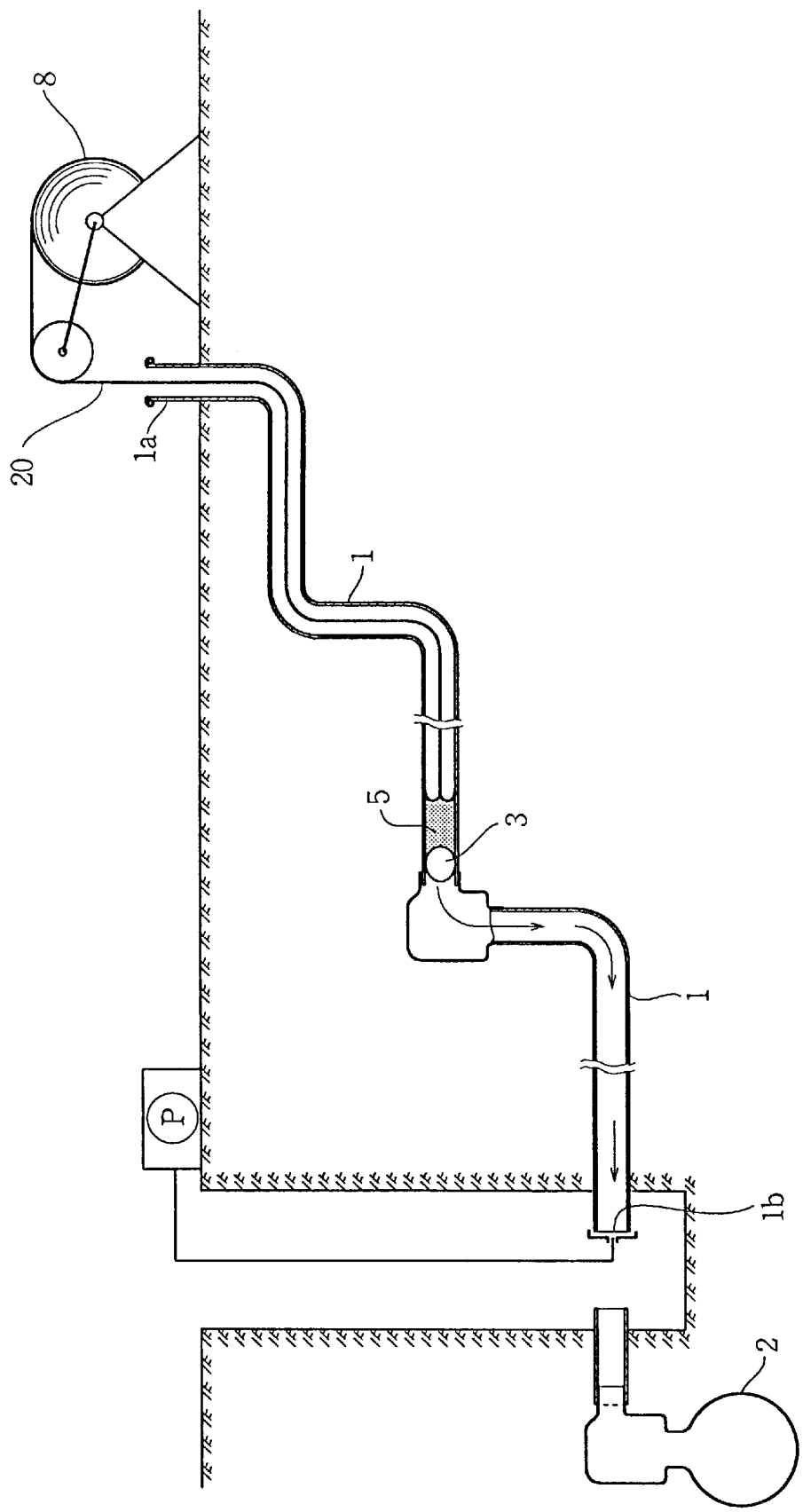
FIG. 2 is an explanatory view schematically illustrating a process in which a reversible lining tube shown in FIGS. 1a and 1b is used for repairing an existing underground pipeline.
Figure 3A:
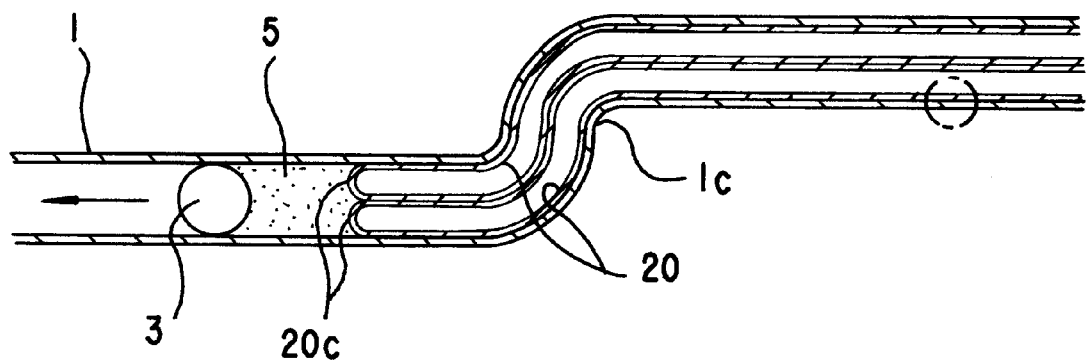
FIGS. 3a–3b is another explanatory view illustrating in more detail how a reversible lining tube shown in FIGS. 1a, 1b and 1c is used for repairing an existing underground pipeline.
Figure 3B:
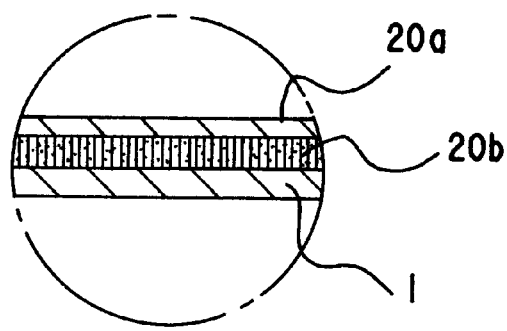
Figure 8A:
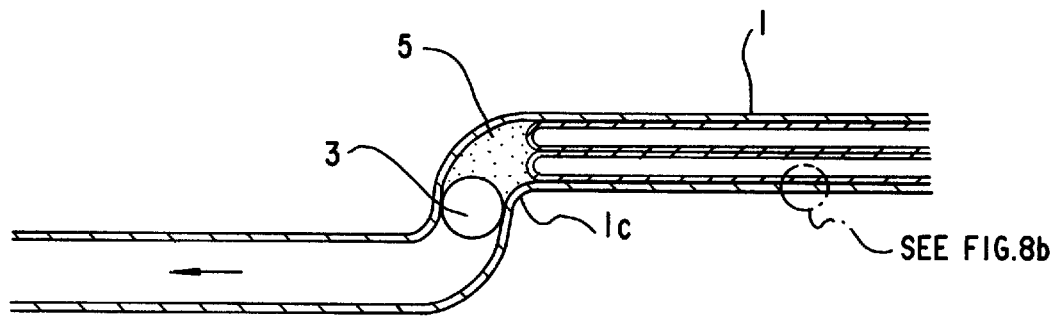
FIGS. 8a–8b are is another explanatory view illustrating in more detail how a conventional lining tube is reversed in an existing underground pipeline for repairing the same.
Figure 8B:
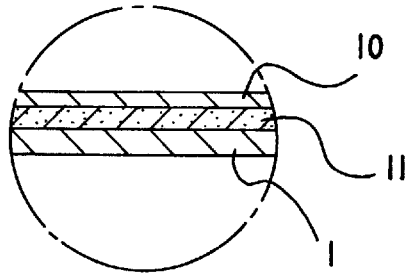
Figure 9A:
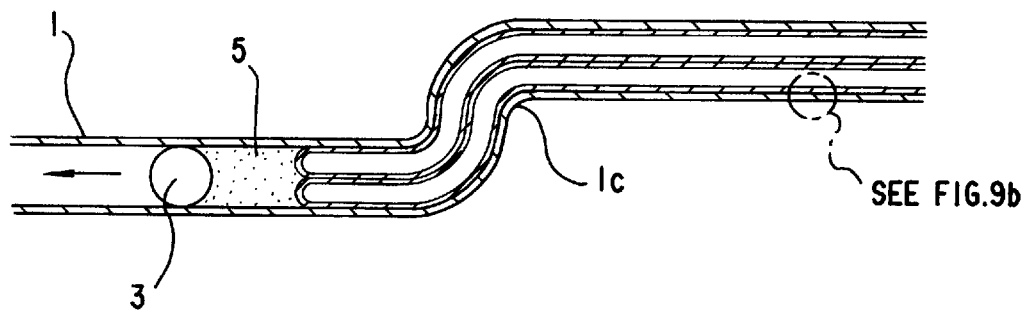
FIGS. 9a–9b are a further explanatory view illustrating in more detail how another conventional lining tube is reversed in an existing underground pipeline for repairing the same.
Figure 9B:
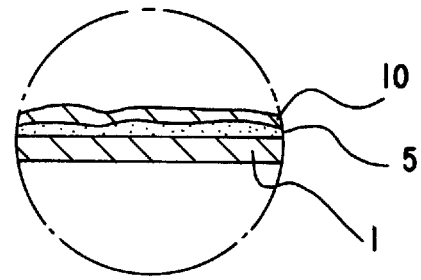

FIGS. 2 and 3a–3b show an actual operation, a process where a reversible lining tube according to the first aspect of the present invention is reversed into an existing underground pipeline to repair the same. However, in FIGS. 2 and 3a–3b, the elements which are the same as those in FIGS. 7–9 will be represented by the same reference numerals.

In FIG. 2, reference numeral 1 represents an existing underground pipeline 1 (such as a gas service pipe) which is to be repaired using the reversible lining tube 20, reference numeral 2 represents a main pipe (such as a gas main buried under ground on road side). In order to perform the repairing operation shown in FIG. 2, the pipeline 1 is cut so as to be separated from the main pipe 2.

As shown in FIG. 2, the existing underground pipeline 1 involves several bent portions. A reel apparatus 8, on which flatly folded reversible lining tube 20 is wounded, is positioned close to one open end 1a of the pipeline 1.

In operation, at first, a resilient leading pig 3 is introduced into the pipeline 1. Then, a necessary amount of adhesive agent 5 is introduced into the pipeline 1. Afterwards, one end of the reversible lining tube 20 is fixed at an open end 1a of the pipeline 1, in a manner such that the lining tube 20 may be reversed into the pipeline 1.

Subsequently, a suction apparatus P is connected to an opposite open end 1b of the pipeline 1, so that a negative pressure is produced into the pipeline 1 to cause the leading pig 3 and the adhesive agent 5 to move towards the open end 1b of the pipeline 1, thereby enabling the reversible lining tube 20 to be reversed into the pipeline 1. In this way, the initial inner surface (the flock layer 20b) of the lining tube 20 becomes outer surface which adheres to the internal surface of the pipeline 1.

At this moment, as shown in FIGS. 3a–3b, since the reversible lining tube 20 is caused to reverse in the pipeline 1 making its reversing/folding portion 20c in contact with the adhesive agent 5, the adhesive agent 5 can coat not only the internal surface of the pipeline 1 but also the reversing/folding portion 20c of the lining tube 20, so that the reversible lining tube 20 may exactly adhere to the internal surface of the pipeline 1 once the flock layer 20b thereof becomes outer surface in contact with the pipeline internal wall.

Referring again to FIGS. 3a–3b, the reversible lining tube 20, which consists of the elastomer layer 20a and the flock layer 20b in a manner as described above, can easily pass through the bent portion 1c involved in the existing underground pipeline 1.

Further, when a lining tube 20 including the elastomer layer 20a and the flock layer 20b is reversed into the pipeline 1, the flock layer 20b becomes outer surface to absorb the adhesive agent 5, so that the finally formed lining layer (including the elastomer layer 20a and the flock layer 20b) has a uniform thickness on the internal surface of the pipeline 1.

Figure 7:
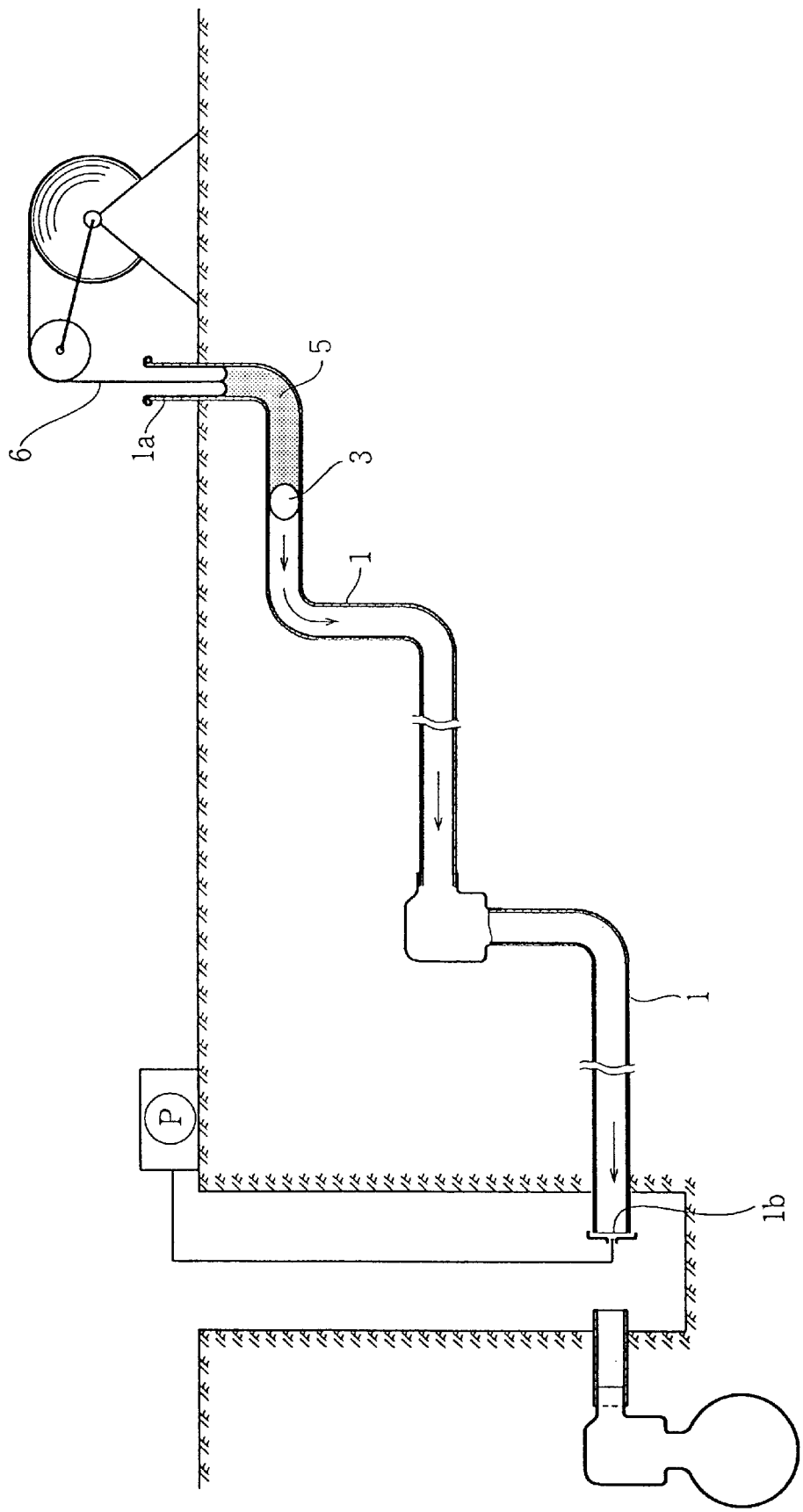
FIG. 7 is an explanatory view schematically illustrating a process in which a conventional lining tube is used for repairing an existing underground pipeline.

Alternatively, similar to a process described in FIG. 7, instead of using a suction apparatus P, it is also possible to connect a pressurizer apparatus (not shown) to the open end 1a. Then, by operating the pressurizer apparatus, a positive pressure is produced into the pipeline 1 to cause the leading pig 3 and the adhesive agent 5 to move towards the open end 1b of the pipeline 1, thereby enabling the reversible lining tube 20 to be reversed into the pipeline 1. In this way, the initial inner surface (flock layer 20b) of the lining tube 20 becomes outer surface which adheres to the internal surface of the pipeline 1.

Figure 4:
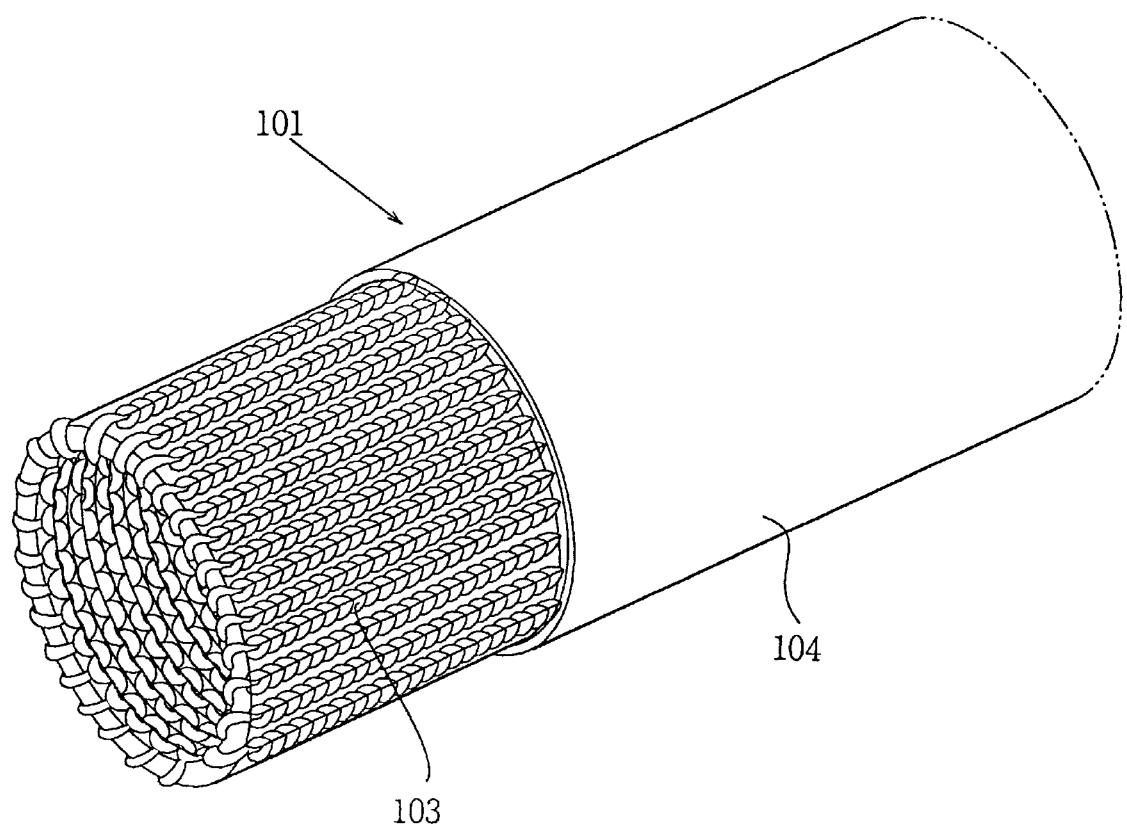
FIG. 4 is a perspective view showing another reversible lining tube for repairing an existing pipeline, according to the second aspect of the present invention.

FIG. 4 shows another reversible lining tube for use in repairing an existing underground pipeline, according to the second aspect of the present invention.

Referring to FIG. 4, a reversible lining tube 101 according to the second aspect of the present invention comprises a thread-knitted layer 103 having a predetermined extensibility, and an elastomer layer 104 formed over the outer surface of the thread-knitted layer 103 so as to cover the same.

In particular, the thread-knitted layer 103 is formed as a thread-knitted tube, the thread material of the thread-knitted layer 103 is formed by covering an polyurethane elastic thread with either a polyester thread or a nylon thread. In detail, the polyurethane elastic thread is used as a core yarn which has a cross sectional size of 20–100 deniers. The polyester thread or nylon thread is used as a cover yarn which has a cross sectional size of 12–100 deniers. Here, the polyester thread or nylon thread serving as a cover yarn is wound around the polyurethane elastic thread serving as a core yarn, thus forming the desired thread material for knitting the thread-knitted layer 103.

The thread-knitted layer 103 is knitted with the use of a Circular Knitting Machine to form a tubular thread-knitted product 103 which is required to have a predetermined flexibility and to be light in weight. When folded into flat form, the tubular thread-knitted product 103 is required to have a width that would be 95%, preferably 90% or less of the inner diameter of a pipeline to be treated. On the other hand, when enlarged in radial direction to its largest extent, its maximum diameter is required to be 2–4 times, preferably 3 times as large as the inner diameter of a pipeline to be treated.

The thread-knitted layer 103 has a specific weight of 100–340 g/m². If the specific weight is less than 100 g/m², the mesh eyes of thread-knitted layer 103 will be too large so that some metal burrs formed on the internal surface of the pipeline will get stuck in such mesh eyes, undesirably cutting the thread-knitted layer 103. On the other hand, if the specific weight is larger than 340 g/m², thread-knitted layer 103 will have too large a thickness that will hamper the reversing movement of the reversible lining tube 101 in the pipeline. Preferably, the specific weight of the thread-knitted layer 103 is 130–270 g/m².

In addition, the thread-knitted tube 103 is required to have an outer diameter which is 75%–90% of the inner diameter of an existing underground pipeline.

On the other hand, the elastomer layer 104 of the reversible lining tube 101 is made of a thermoplastic polyurethane. With the use of the thermoplastic polyurethane, it is sure to obtain a sufficient flexibility for the lining tube 101, so as to avoid any possibility of decreasing the flexibility of the thread-knitted layer 103.

In fact, the elastomer layer 104 of the reversible lining tube 101 has a hardness of 65–75 Japanese Industrial Standard-A (hereinafter JIS-A). If the hardness is less than 65 (JIS-A), there will not be sufficient strength for the reversible lining tube 101. On the other hand, if the hardness is greater than 75 (JIS-A), there will not be sufficient flexibility for the reversible lining tube 101, hence it will be difficult for the lining tube 101 to be smoothly reversed in an existing pipeline. Also, when the hardness of the elastomer layer 104 is 65–75 (JIS-A), it has been found possible to prevent occurrence of pin holes during the hardening of adhesive agent (such as epoxy resin) layer which will be impregnated through thread-knitted layer 103 between the elastomer layer 104 and the internal wall of the pipeline.

In detail, the thermoplastic polyurethane elastomer may be ester polyurethane elastomer such as caprolacton polyurethane elastomer or adipate polyurethane elastomer. What may be used as a long chain polyol in the caprolacton polyurethane elastomer or adipate polyurethane elastomer, are polyesterdiol such as poly-ε-caprolacton, poly(ethylene adipate), poly(butylene adipate), poly(hexane adipate). On the other hand, the thermoplastic polyurethane elastomer may also be ether polyurethane elastomer. What may be used as a long chain polyol in the ether polyurethane elastomer, may be polyether diol such as polyoxytetramethylene glycol or polypropylene glycol.

Further, the elastomer layer 104 is made of a thermoplastic polyurethane having a specific weight of 340–610 g/m². If the specific weight is less than 340 g/m², the elastomer layer 104 will not have sufficient abrasion resistance and hence be easily broken due to metal burr formed on the pipeline internal wall. On the other hand, if the specific weight is greater than 610 g/m², it will be difficult for the lining tube 101 to be smoothly reversed in an existing pipeline.

The elastomer layer 104, comprising one of the above described substances, is formed to completely cover the outer surface of the tubular thread-knitted product 103, by means of Melting Ejection Formation.

The reversible lining tube 101 having an above-described structure and properties may be manufactured in one of the following examples.

EXAMPLE 1

Manufacturing a Thread-knitted Tube

Core Yarn: one polyurethane elastic tread (20 denier)
Cover Yarn: two nylon threads (12 denier)

A Circular Knitting Machine was used for the manufacturing of a thread-knitted tube, thereby obtaining a thread-knitted tube 103 (as shown FIG. 4) having a specific weight of 150 g/m² and a folded width of 65 mm.

Manufacturing a Reversible Lining Tube

The thread-knitted tube 103 was continuously fed to an Extruding Machine having a cross head die, thus forming an elastomer layer 104 coverring the outer surface of the thread-knitted tube 103. In detail, the elastomer layer 104 is formed of adipate polyurethane having a hardness of 70 (JIS-A), thereby obtaining the reversible lining tube 101.

Now, an actual operation for repairing an existing underground pipeline with the use of a reversible lining tube 101 manufactured in the above example 1, will be described in detail with reference to FIG. 5.

Figure 5:
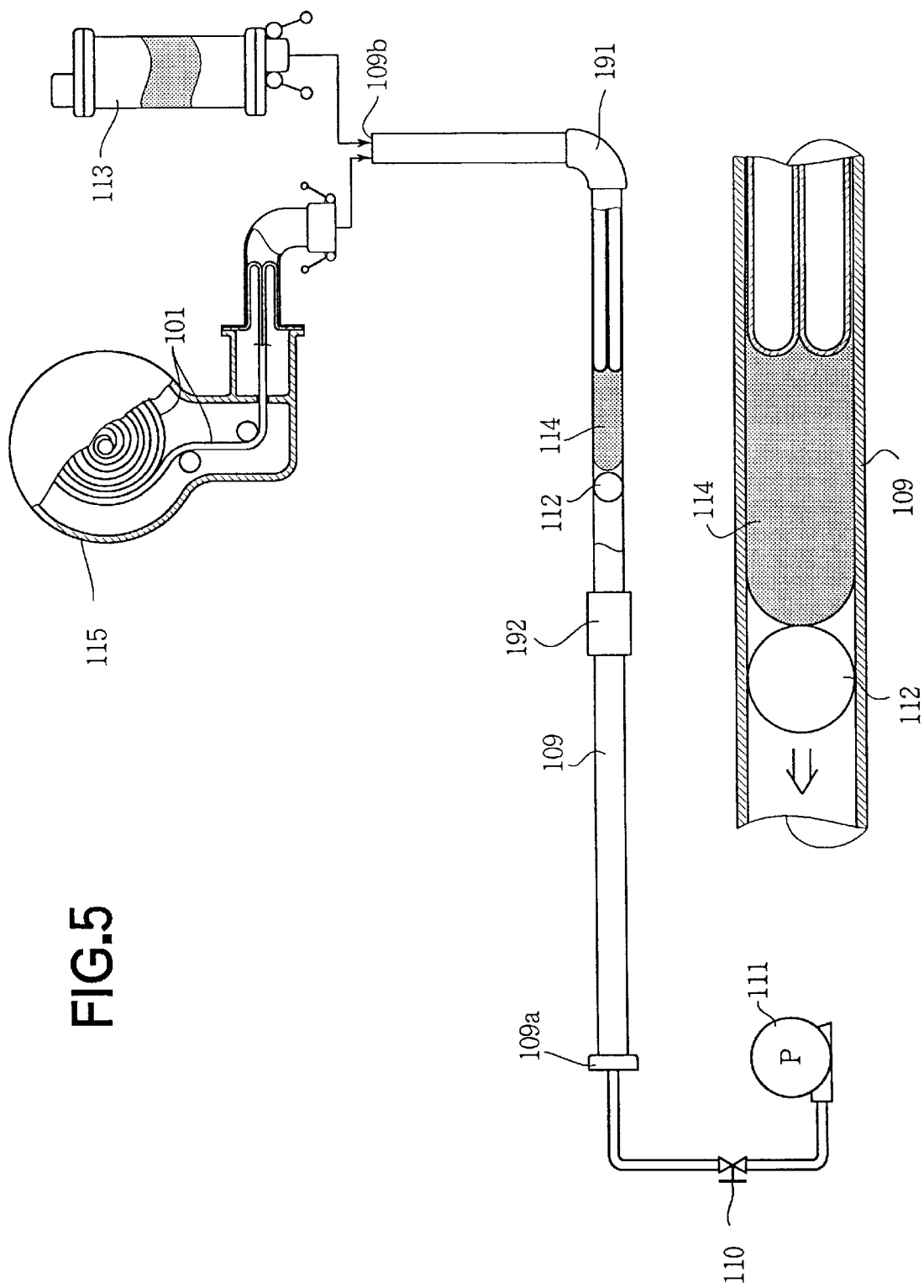
FIG. 5 is an explanatory view schematically illustrating a process in which a reversible lining tube shown in FIG. 4 is used for repairing an existing underground pipeline.

Referring to FIG. 5, a suction pump 111 is connected through a valve 110 to one end 109a of an existing pipeline 109 involving an elbow 191 and a socket 192.

At first, a leading pig 112 made of a sponge having a diameter slightly larger than pipeline inner diameter, is introduced into the pipeline 109 through another open end 109b. Then, a resin cassette 113 is attached to the open end 109b of the pipeline, and a predetermined amount of resin (serving as an adhesive agent) is introduced into the pipeline 109 by operating the suction pump 111.

Afterwards, the suction pump 111 is stopped, the resin cassette 113 is removed from the open end 109b, a lining tube receiving/feeding apparatus 115 is attached to the open end 109b of the pipeline 109. A predetermined length of the reversible lining tube 101 is reeled up and received in the apparatus 115, with one end of the tube 101 reversed and fixed within the apparatus in a manner such that the lining tube 101 may be reversed into the pipeline 1.

Subsequently, the suction pump 111 is again operated so that the leading pig 112 and the adhesive resin 114 are caused to move towards the open end 109a of the pipeline 109, thus enabling the lining tube 101 to be reversed into and through the pipeline 109, with the thread-knitted layer 103 of the lining tube 101 adhering to the internal surface of the pipeline 109. In this way, the existing pipeline 109 may be lined with the lining tube 101.

Figure 6:
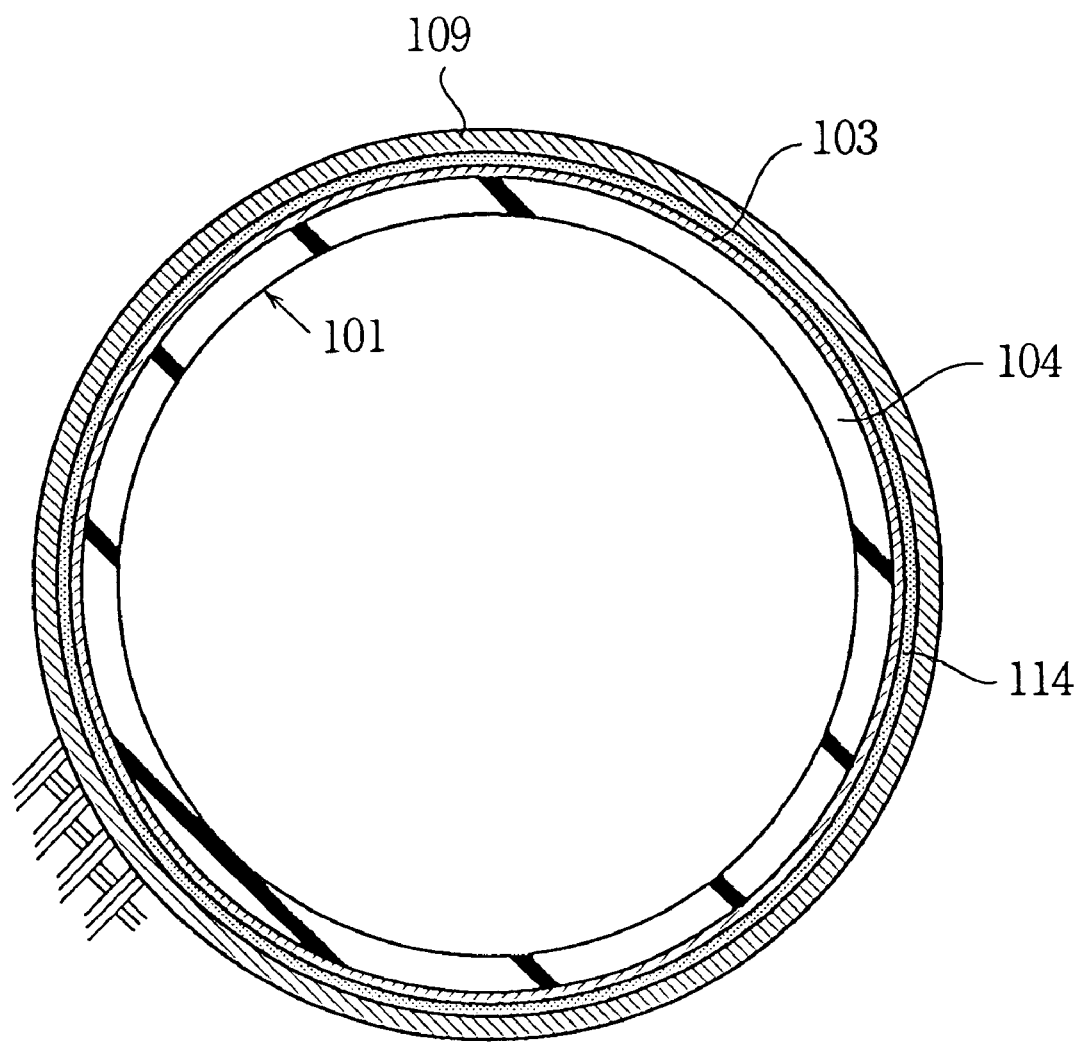
FIG. 6 is a cross sectional view showing an existing pipe lined with the reversible lining tube shown in FIG. 4.

FIG. 6 is a cross sectional view showing an actual condition of the existing old pipeline 109 lined with the lining tube 101 (including the elastomer layer 104 and the thread-knitted layer 103) by virtue of the adhesive resin 114. It is seen from the FIG. 6 that the lining tube 101 has been properly bonded on the internal surface of the pipeline 109 in a desired manner without any defects such as dropping or cracks. Also, similar results have been obtained in bent portions such as elbows 191 of the pipeline 109.

EXAMPLE 2

Manufacturing a Thread-knitted Tube

Core Yarn: one polyurethane elastic tread (20 denier)
Cover Yarn: one nylon thread (50 denier)

A Circular Knitting Machine was used for the manufacturing of a thread-knitted tube, thereby obtaining a thread-knitted tube 103 (as shown FIG. 4) having a specific weight of 230 g/m² and a folded width of 65 mm.

Manufacturing a Reversible Lining Tube

The thread-knitted tube 103 was continuously fed to an Extruding Machine having a cross head die, thus forming an elastomer layer 104 coverring the outer surface of the thread-knitted tube 103. Similarly, the elastomer layer 104 is formed of adipate polyurethane having a hardness of 70 (JIS-A), thereby obtaining the reversible lining tube 101.

When a reversible lining tube 101 manufactured in Example 2 is used for repairing an existing underground pipeline, it was found to have obtained the same results as those when using a reversible lining tube 101 manufactured in Example 1.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A reversible lining tube for repairing an existing pipeline, said lining tube being reversible into the existing pipeline so that its initial inner surface becomes its outer surface which adheres to the internal surface of the pipeline, comprising:

an elastomer layer; and a flock layer, wherein the flock layer is a fiber layer formed on one surface of the elastomer layer and including an adhesive agent and an amount of short fiber which adheres to the adhesive-coated surface of the elastomer layer by virtue of static electricity effect, wherein prior to reversal into the existing pipeline, the elastomer layer is an outer layer and the flock layer is an inner layer, upon reversal into the existing pipeline the elastomer layer becomes an inner layer and the flock layer becomes an outer layer which adheres to the internal surface of the existing pipeline.

2. A reversible lining tube according to claim 1, wherein the elastomer layer is a polyurethane layer, a polyester layer, a butyl rubber layer, a polyisobutylene layer, or a polyvinyl chloride layer.

3. A reversible lining tube according to claim 1, wherein said short fiber of the flock layer is an aromatic polyamide fiber, a nylon fiber, a rayon fiber, a polyester fiber, an acrylic fiber, a vinylon fiber, or a polypropylene fiber.

4. A reversible lining tube according to claim 1, wherein the elastomer layer has a thickness of 0.3–1.5 mm.

5. A reversible lining tube according to claim 1, wherein the flock layer has a thickness of 2 mm or less.

6. A reversible lining tube for repairing an existing pipeline, said lining tube being reversible into the existing pipeline so that its initial inner surface becomes its outer surface which adheres to the internal surface of the pipeline, comprising:

an elastomer layer; and a thread-knitted layer, wherein the thread-knitted layer is a thread-knitted tube, the thread material of the thread-knitted layer includes a polyurethane elastic thread covered with either a polyester thread or a nylon thread, wherein prior to reversal into the existing pipeline the elastomer layer is an outer layer and the thread-knitted layer is an inner layer, upon reversal into the existing pipeline the elastomer layer becomes an inner layer and the thread-knitted layer becomes an outer layer which adheres to the internal surface of the existing pipeline.

7. A reversible lining tube according to claim 6, wherein the thread-knitted tube has an outer diameter which is 75%–90% of the inner diameter of the existing pipeline.

8. A reversible lining tube according to claim 6, wherein the thread-knitted tube has a specific weight of 100–340 g/m².

9. A reversible lining tube according to claim 6, wherein the elastomer layer is a thermoplastic polyurethane elastomer layer.

10. A reversible lining tube according to claim 6, wherein the elastomer layer has a specific weight of 340–610 g/m².

* * * * *